United States Patent
Schneider

(10) Patent No.: US 8,645,839 B2
(45) Date of Patent: Feb. 4, 2014

(54) ONLINE DESKTOP DISTRIBUTION

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1412 days.

(21) Appl. No.: 12/072,558

(22) Filed: Feb. 26, 2008

(65) Prior Publication Data

US 2009/0217174 A1 Aug. 27, 2009

(51) Int. Cl.
*G06F 3/048* (2013.01)
*G06F 15/16* (2006.01)

(52) U.S. Cl.
USPC .......................... 715/744; 715/779

(58) Field of Classification Search
USPC .................. 715/744, 779
See application file for complete search history.

(56) References Cited

U.S. PATENT DOCUMENTS

| 2006/0026687 A1* | 2/2006 | Peikari .............................. 726/24 |
| 2007/0101435 A1* | 5/2007 | Konanka et al. ................. 726/27 |
| 2007/0192329 A1* | 8/2007 | Croft et al. ....................... 707/10 |
| 2009/0063178 A1* | 3/2009 | Pousti et al. ...................... 705/1 |
| 2009/0228824 A1* | 9/2009 | Forstall et al. ................. 715/779 |

* cited by examiner

*Primary Examiner* — Andrea Leggett
(74) *Attorney, Agent, or Firm* — Lowenstein Sandler LLP

(57) ABSTRACT

An apparatus and a method for an online desktop distribution is described. In one embodiment, an online desktop operates on a client with an online desktop distributor having an operating system with one or more kernels compiled for usermode. A server coupled to the client stores and uploads a user profile setting to the client to configure the online desktop on the client based on a user login on the online desktop. The online desktop can be booted from the client with the online desktop distributor or run as a hosted operating system in usermode under a default operating system of the client.

20 Claims, 5 Drawing Sheets

ONLINE DESKTOP DISTRIBUTION

TECHNICAL FIELD

Embodiments of the present invention relate to computing systems, and more particularly, to online desktop distribution.

BACKGROUND

Online desktop is an Operating System that keeps all its information online. The online desktop can be run from a live CD or be as easily fully installed. When a user starts up a newly-installed computer, or visits a friend's house, the user's whole environment will be the same, with no setup to redo. This is also known as a Stateless Linux Desktop. The user's files and settings are stored somewhere else.

In order to provide easy portable access to a user's configuration and files, one basic technique is to provide a stripped-down Linux distro on a bootable storage device, and have the system download the user's configuration files and commonly used data files when the user boots up and logs in. However, there are a few problems with this. First, the installation requires rebooting. Second, no matter what applications or program was installed as part of the distribution, there will always be something some user will need that was not installed. Thus, a need exists for a technique to provide an online desktop distribution that does not require a reboot to use.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for an online desktop distribution. In one embodiment, an online desktop operates on a client with an online desktop distributor having an operating system with one or more kernels compiled for usermode. A server coupled to the client stores and uploads a user profile setting to the client to configure the online desktop on the client based on a user login on the online desktop. The online desktop can be booted from the client with the online desktop distributor or run as a hosted operating system in usermode under a default operating system of the client. The online desktop does not need to be installed on the client. The online desktop can thus operate on the client without installation or reboot.

Figure 1:
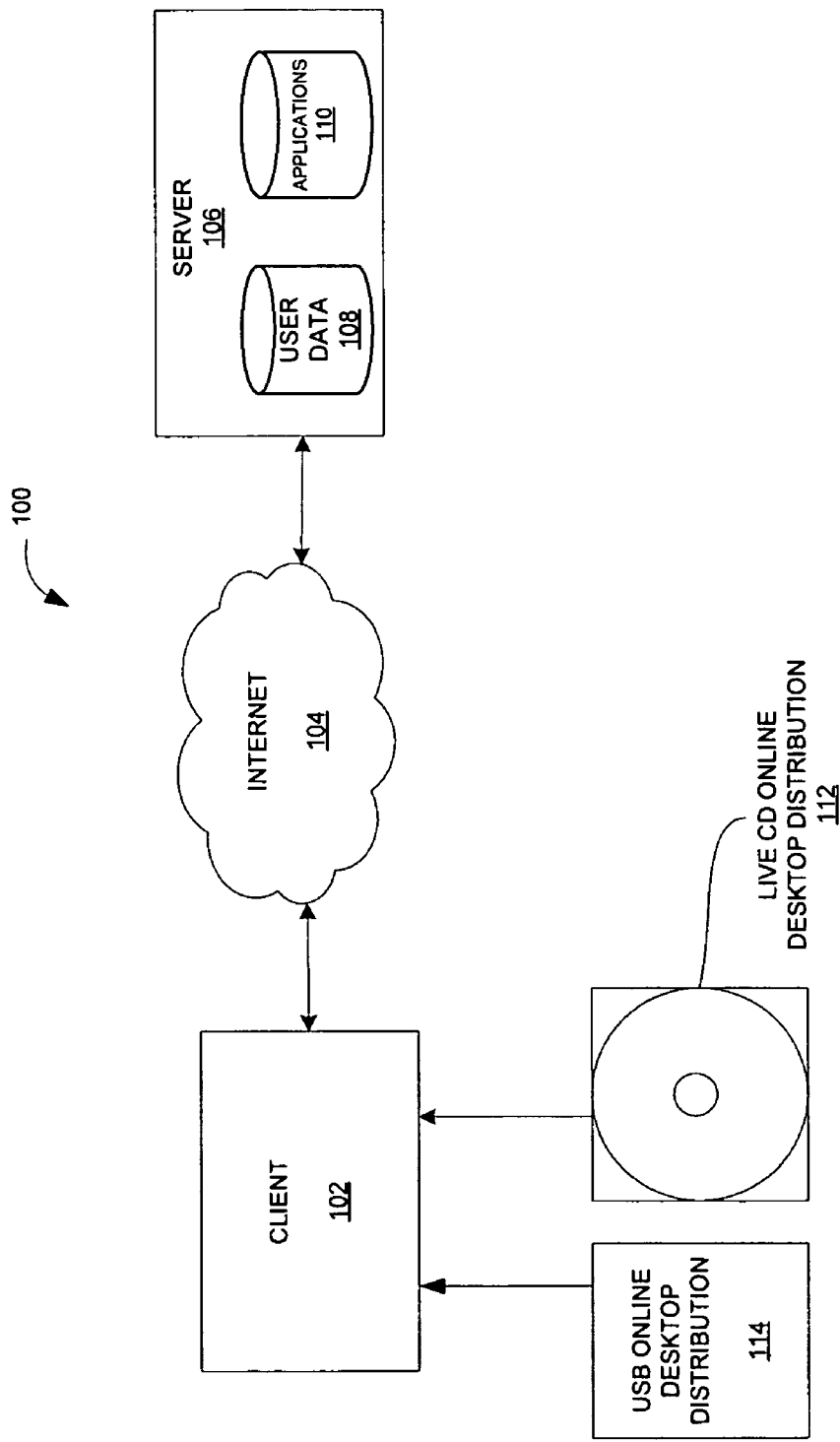
FIG. 1 is a block diagram illustrating one embodiment of a system for an online desktop distribution.

FIG. 1 is a block diagram illustrating one embodiment of a system 100 for an online desktop distribution. System 100 includes a client 102 capable of communicating with one or more servers, such as server 106, via a network, such as the Internet 104. An online desktop can be installed on the client via an online desktop distributor. Those of ordinary skills in the art will recognize that the online desktop distributor may be provided via many means, for example, a live bootable CD 112, or a bootable USB key 114.

In accordance with one embodiment, the online desktop distributor may include an operating system with one or more kernels compiled for usermode so that the operating system can run directly on the client without installation or reboot. For example, the online desktop distributor can include a basic Linux distribution, just enough to initialize networking, a basic X server, a web browser, and a small number of commonly used applications. In one embodiment, these could be presented as a filesystem in a file.

In one embodiment, client 102 runs the online desktop by booting directly from the online desktop distributor. In another embodiment, client 102 runs the online desktop as a hosted operating system in usermode under the default operating system on client 102. For example, online desktop can run as a hosted OS in usermode under Windows or Linux. As such, kernels are compiled for usermode Linux and CoLinux (these are kernels ported to run as user-mode processes on Linux™ and Microsoft Windows™, respectively).

Client 102 includes the necessary hardware to be able to boot and mount the online desktop distributor. In accordance with another embodiment, the client user is presented with three options: boot the distribution directly, load the distribution under Linux™, and load the distribution under Windows™. Those of ordinary skills in the art will recognize that online desktop can operate as a hosted OS under other operating systems.

Server 106 stores a user data 108, such as profile settings and documents, and applications 110. As such, after mounting the online desktop on the client, client 102 configures the online desktop based on a user login on the online desktop.

In one embodiment, server 106 stores and uploads one or more applications associated with the user profile setting to client 102. Users could pay a flat subscription fee, a fee based on storage used, a fee based on bandwidth used, or some combination. To make it viable, the backing servers would need to provide a wide array of applications that are optimized to this distribution strategy, and an easy way for users to sign up and manage their accounts. Corporate accounts with centralized management and usage reporting can be provided.

Figure 2:
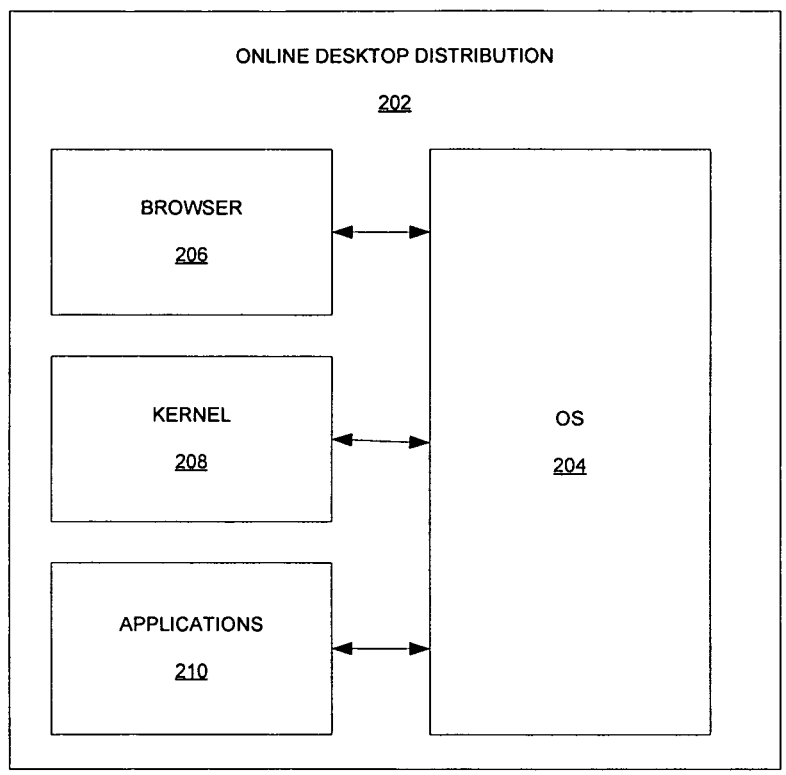
FIG. 2 is a block diagram illustrating one embodiment of an online desktop distributor.

FIG. 2 is a block diagram illustrating one embodiment of an online desktop distributor 202. Online desktop distributor 202 includes an operating system 204 with one or more kernels 208 compiled for usermode so that the operating system operate without rebooting a client. For example, the online desktop distributor can include a basic Linux distribution, just enough to initialize networking, a basic X server, a web browser 206, and a small number of commonly used applications 210 (such as word processing, spreadsheets, etc. . . . ). In one embodiment, these could be presented as a filesystem in a file.

In one embodiment, operating system 204 can operate by booting directly from the online desktop distributor 202. In another embodiment, a client runs operating system 204 as a hosted operating system in usermode under the default operating system on the client. For example, online desktop can run as a hosted OS in usermode under Windows or Linux. As such, kernels are compiled for usermode Linux and CoLinux (these are kernels ported to run as user-mode processes on Linux™ and Microsoft Windows™, respectively). In one embodiment, the kernels are compiled for usermode Linux and CoLinux (these are kernels ported to run as user-mode processes on Linux™ and Microsoft Windows™, respectively).

Figure 3:
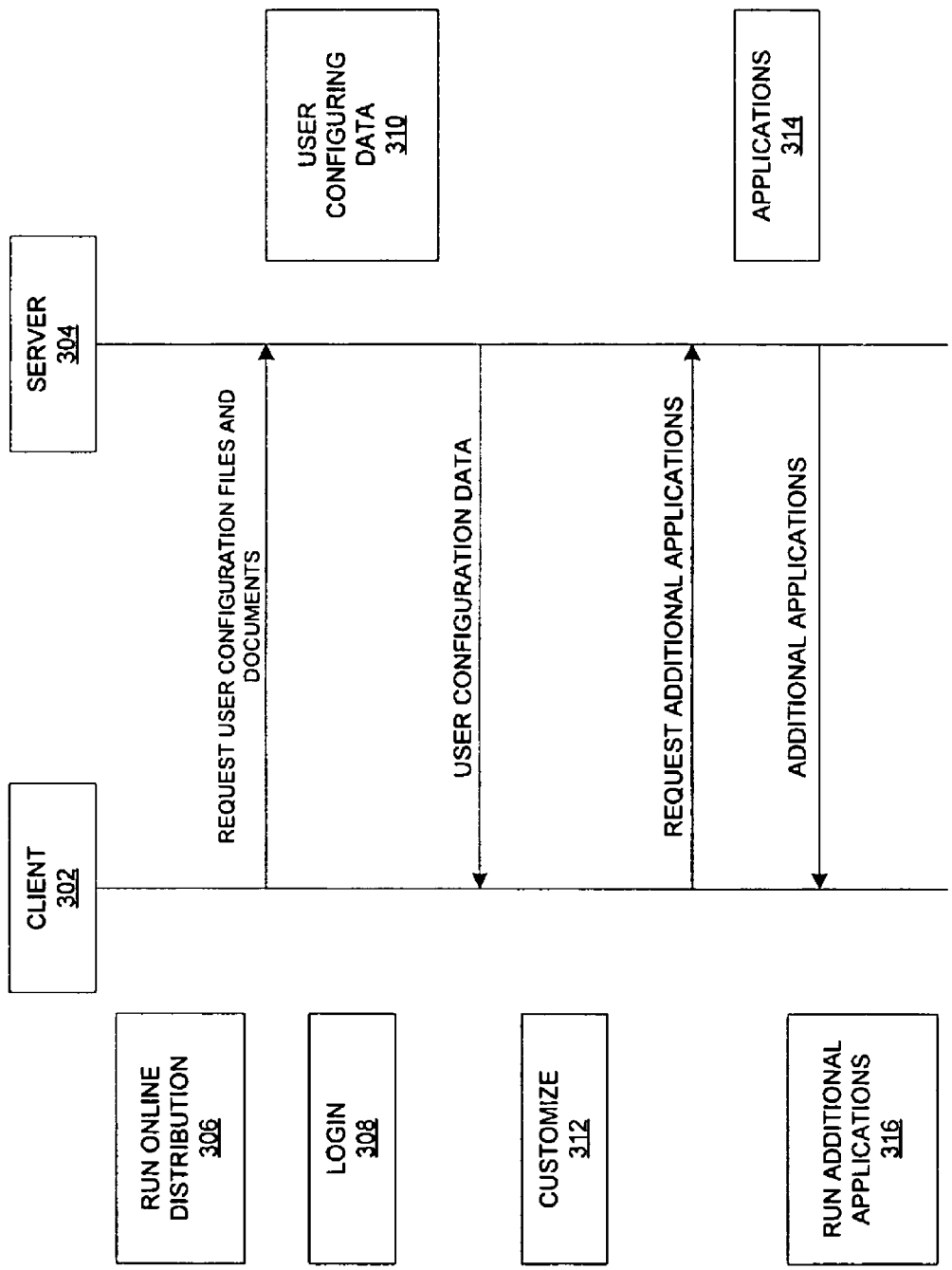
FIG. 3 is a ladder diagram illustrating one embodiment of a system for an online desktop distribution.

FIG. 3 is a ladder diagram illustrating one embodiment of a system for an online desktop distribution. An online desktop distributor is installed on a client 302 from a storage device such as a USB key, or a live bootable CD. In one embodiment, the user is presented with three options: boot the distribution directly, load the distribution under Linux™, and load the distribution under Windows™. After mounting the online desktop, a user can log in. Client 302 then requests user configuration data 310 including settings and documents associated with the user login from a server 304. Once the user configuration data 310 has been downloaded at client 302, client 302 customizes the online desktop accordingly without having to reboot client 302.

In another embodiment, the login user may request for additional applications to be available on the online desktop on client 302 by downloading selected applications 314 from server 304. These selected additional applications 314 are installed at 316.

Figure 4:
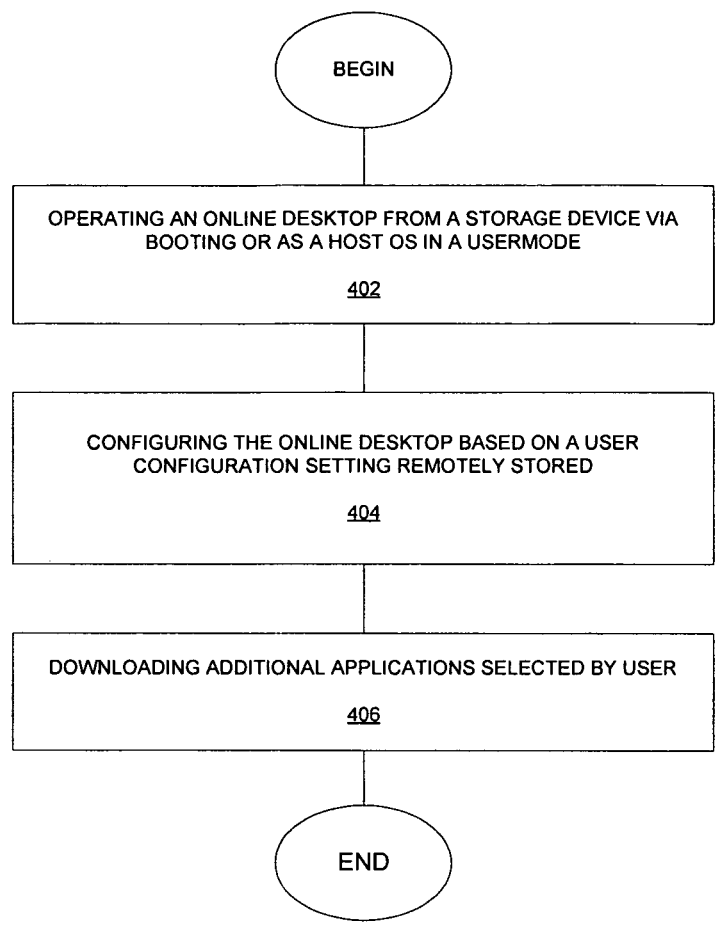
FIG. 4 is a flow diagram illustrating one embodiment of a method for an online desktop distribution.

FIG. 4 is a flow diagram illustrating one embodiment of a method for an online desktop distribution. At 402, a storage device storing an online desktop distribution is coupled to a client where the online desktop operate on the client directly from the storage device without having to install files or reboot the client. After login in, at 404, the online desktop is reconfigured based on a user configuration settings downloaded from a server based on the user login. In another embodiment, additional data documents and applications can be downloaded on the online desktop without having to reboot the online desktop.

Figure 5:
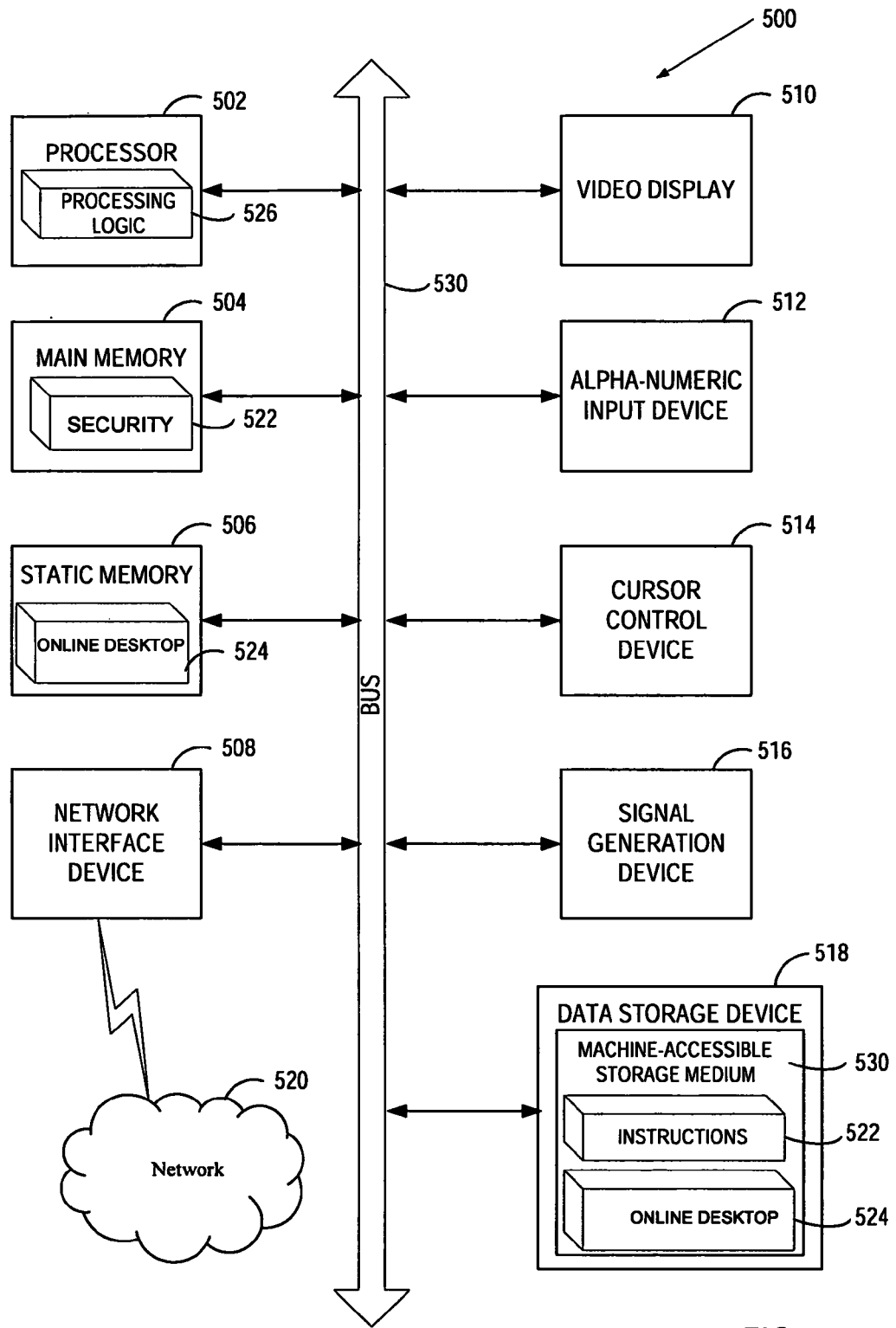
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the online desktop distribution kit 524 as presently described. The online desktop distribution kit 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for operating an online desktop on a client comprising:
    providing an online desktop distributor comprising an operating system with one or more kernels compiled for usermode;
    operating, by a processing device, the online desktop on the client from the online desktop distributor; and
    downloading a user profile setting to configure the online desktop on the client based on a user login on the online desktop.

2. The computer-implemented method of claim 1 further comprising:
    downloading one or more data files and one or more applications associated with the user profile setting.

3. The computer-implemented method of claim 2 wherein operating the online desktop further comprises booting the client with the online desktop distributor.

4. The computer-implemented method of claim 2 wherein operating the online desktop further comprises running the online desktop as a hosted Operating System in usermode under a default Operating System of the client.

5. The computer-implemented method of claim 1 wherein the operating system comprises an open-source operating system.

6. A non-transitory computer-readable storage medium comprising data that, when accessed by a processing device, cause the processing device to perform operations comprising:
    providing an online desktop distributor comprising an operating system with one or more kernels compiled for usermode;
    operating, by the processing device, an online desktop on a client with the online desktop distributor; and
    downloading a user profile setting to configure the online desktop on the client based on a user login on the online desktop.

7. The non-transitory computer-readable storage medium of claim 6 wherein the operations further comprise:
    downloading one or more data files and one or more applications associated with the user profile setting.

8. The non-transitory computer-readable storage medium of claim 7 wherein operating the online desktop further comprises booting the client with the online desktop distributor.

9. The non-transitory computer-readable storage medium of claim 7 wherein operating the online desktop further comprises running the online desktop as a hosted operating system in usermode under a default operating system of the client.

10. The non-transitory computer-readable storage medium of claim 6 wherein the operating system comprises an open-source operating system.

11. An online desktop distributor comprising:
    a storage device comprising an operating system with one or more kernels compiled for usermode, a web browser, a set of applications,
    a processing device, coupled to the storage device the processing device to execute the operating system, wherein the operating system is to be operated as an online desktop on a client, the client is to download a user profile setting to configure the online desktop on the client based on a user login on the online desktop.

12. The online desktop distributor of claim 11 wherein the operating system is to download one or more data files and one or more applications associated with the user profile setting.

13. The online desktop distributor of claim 12 wherein the operating system is to be booted from the client with the storage device.

14. The online desktop distributor of claim 12 wherein the operating system is to run as a hosted Operating System in usermode under a default Operating System of the client.

15. The online desktop distributor of claim 11 wherein the operating system comprises an open-source operating system.

16. A system comprising:
    a client device to operate an online desktop with an online desktop distributor comprising an operating system with one or more kernels compiled for usermode; and
    a server device coupled to the client device, the server device to store and upload a user profile setting to the client device to configure the online desktop on the client device based on a user login on the online desktop.

17. The system of claim 16 wherein the server device is to store and upload one or more data files and one or more applications associated with the user profile setting to the client device.

18. The system of claim 17 wherein the operating system is to be booted from the client device with the online desktop distributor.

19. The system of claim 17 wherein the operating system is to run as a hosted Operating System in usermode under a default Operating System of the client device.

20. The system of claim 16 wherein the operating system comprises an open-source operating system.

* * * * *